United States Patent
Douglas

[11] Patent Number: 5,975,434
[45] Date of Patent: Nov. 2, 1999

[54] SHOWERHEAD SYSTEM WITH TURBULENCE INDUCING AND WATER PURIFICATION MEANS

[76] Inventor: John H Douglas, 14001 63rd Way, Clearwater, Fla. 34620

[21] Appl. No.: 09/059,051

[22] Filed: Apr. 13, 1998

[51] Int. Cl.⁶ .................................................. B05B 1/14
[52] U.S. Cl. ................ 239/553.3; 239/553; 239/553.5; 239/462; 239/590; 239/590.3; 239/590.5; 239/DIG. 23; 210/282; 210/285; 210/449
[58] Field of Search ...................... 239/104, 553, 239/553.3, 553.5, 462, 590, 590.3, 590.5, DIG. 23; 210/282, 283, 285, 289, 291, 449

[56] References Cited

U.S. PATENT DOCUMENTS

| 231,494 | 8/1880 | McCauley et al. | 210/449 |
| 2,334,802 | 11/1943 | Zuckermann | 210/449 X |
| 2,690,930 | 10/1954 | Corson | 239/462 X |
| 3,519,134 | 7/1970 | Hassinger | 210/282 |
| 4,242,201 | 12/1980 | Stephens et al. | 210/282 X |
| 4,657,186 | 4/1987 | Shapiro | 239/DIG. 23 X |
| 5,149,437 | 9/1992 | Wilkinson et al. | 210/282 X |
| 5,503,742 | 4/1996 | Farley | 210/282 X |

FOREIGN PATENT DOCUMENTS

| 4470 | 2/1902 | United Kingdom | 210/283 |

*Primary Examiner*—Andres Kashnikow
*Assistant Examiner*—Robin O. Evans
*Attorney, Agent, or Firm*—M. K. Silverman

[57] ABSTRACT

A showerhead system with internal filtration media includes a fluid-tight pressure housing having a fluid inlet and a fluid outlet, the outlet substantially co-axial with the inlet, the housing having a substantially cylindrical internal surface. The system further includes several porous radial disks axially disposed internally to the pressure housing and having circumferential edges in integral communication with the internal cylindrical surface of the pressure housing. The system also include filtration media positional within regions defined between the porous disks. The system additionally includes at least one rigid radial disk axially disposed within the axial distribution of the plurality of porous disks, the rigid disk including groups of apertures. The rigid disk may or may not have an integral securement to the internal cylindrical surface of the pressure housing such that its axial position, within the system, is defined by filtration media packed on either side of it. As such, water is able to pass both through apertures in the rigid disk and across an annular region between the circumference of the rigid disk and the internal diameter of the internal surface of the pressure housing. Water flows of enhanced general turbulence are obtained.

24 Claims, 2 Drawing Sheets

SHOWERHEAD SYSTEM WITH TURBULENCE INDUCING AND WATER PURIFICATION MEANS

BACKGROUND OF THE INVENTION

The present invention relates to a showerhead and, more particularly, to a showerhead system which provides for internal purification and filtration of water delivered therefrom.

A problem in the prior art of showerheads having internal means for purification and filtration has been that the velocity of water passing therethrough has often been insufficient to accomplish efficient removal of contaminants. In addition to the problem of sufficient velocity, it has been found that prior art showerheads, provided with internal water filtration means, do not operate efficiently if there does not exist sufficient turbulence, that is, random or chaotic motion within the showerhead housing to expose all parts and elements of the filtration media to water passing therethrough. Resultingly, when sufficient turbulence or random motion of the water does not exist within the showerhead housing, so-called dead spots will develop which give rise to internal channeling within the filter media.

The instant invention may, accordingly, be viewed as a response to the above set forth need in the art for a showerhead with internal water purification means that will treat water passing therethrough in an optional fashion through increases in axial velocity, internal turbulence, and random radial motion of water passing through the filtration media of such showerheads.

The inventor is unaware of any prior art which specifically addresses the issues set forth above.

SUMMARY OF THE INVENTION

The instant inventive showerhead system with internal filtration means includes a fluid-tight pressure housing having a fluid inlet and a fluid outlet thereto, said outlet substantially co-axial with said inlet, said housing having a substantially cylindrical internal surface. The system further includes a plurality of porous radial disks axially disposed internally to said pressure housing and having circumferential edges thereof in integral communication with said internal cylindrical surface of said pressure housing. The system further includes filtration media secured within regions defined between said porous disks. The system yet further includes at least one rigid radial disk axially disposed within the axial distribution of said plurality of porous disks, said rigid disk including a plurality of apertures. Said rigid disk may or may not have an integral securement to the internal cylindrical surface of said pressure housing such that the axial position thereof, within the instant system, is defined by filtration media packed on either side thereof. As such, water is able to pass both through apertures in said rigid disk and across an annular region between the circumference of said rigid disk and the internal diameter of said internal surface of the pressure housing.

It is an object of the present invention to provide an improved showerhead with internal water filtration capability.

It is another object to provide a showerhead of the above type in which water flow through the inventive head system is provided with accelerated axial velocity, greater general turbulence, and enhanced random or chaotic radial motion.

It is a further object to provide a showerhead system with water filtration capability which prevents "dead spots" and channeling through filtration media internal thereto.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
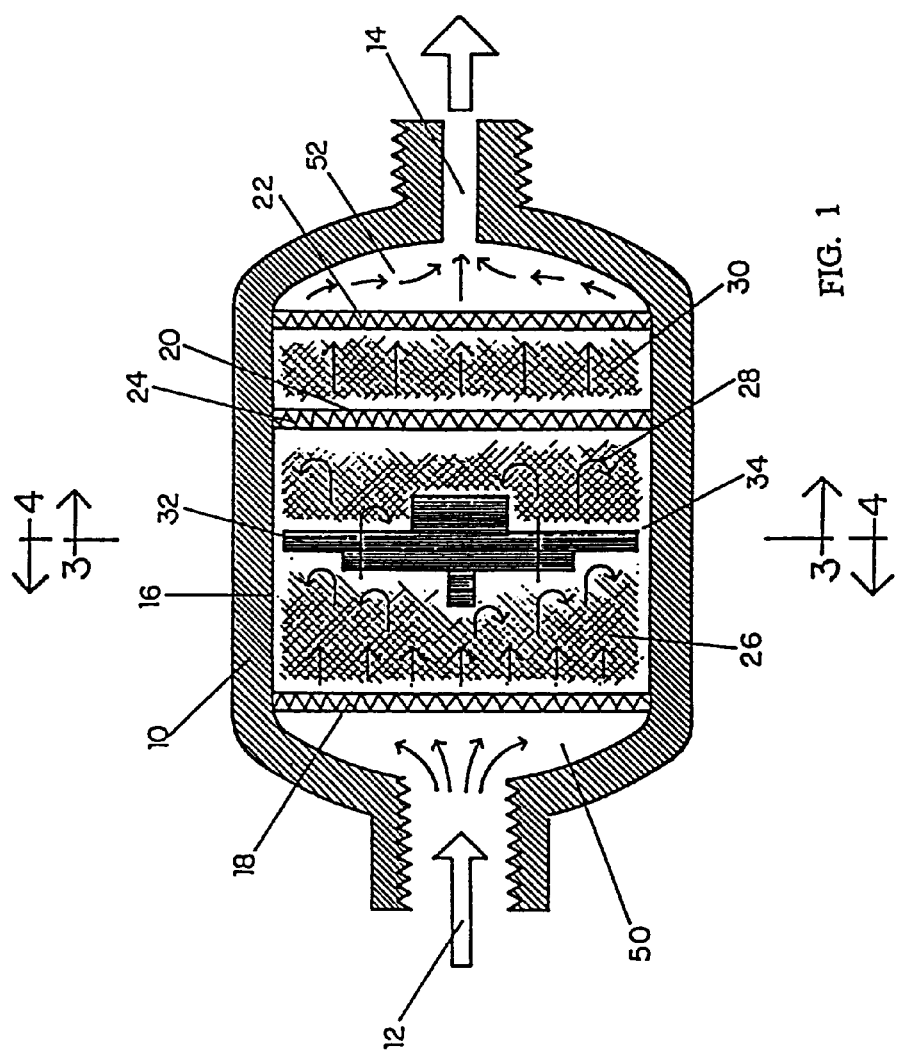
FIG. 1 is an axial cross-sectional view of the inventive showerhead system.

With reference to the axial cross-sectional view of FIG. 1, the present inventive showerhead with internal water filtration means may be seen to include a fluid tight pressure housing 10 which includes a fluid inlet 12 at the upstream side of the housing and a fluid outlet 14 at the downstream side thereof. As may be noted, said outlet 14 is substantially co-axial with inlet 12.

Further, said pressure housing 10 includes a substantially cylindrical internal diameter and corresponding internal surface 16.

In FIG. 1 it is to be noted that water flow is designated by the various shaped arrows therein. Also, there may be seen a plurality of porous radial disks 18, 20 and 22. Said disks are disposed internally to said pressure housing 10 and each exhibits circumferential peripheral edges 24 which are in integral mechanical communication with said internal surface 16 of pressure housing 10. This rigid mechanical relationship between internal surface 16 and radial disks 18, 20 and 22 enables the securement of various filtration media 26, 28 and 30 therebetween. It is to be understood that many filtration media are known in the art; however, in a preferred embodiment of the instant invention, the media of region 26 is a metallic or KDF media as is the media of region 28, while the media of region 30 is an activated carbon filter.

It is to be understood that disks 18, 20 and 22 all comprise particulate, or inorganic filters, this as opposed to biologic or micron filtering which is effected by the filter media 26, 28 and 30.

Figure 2:
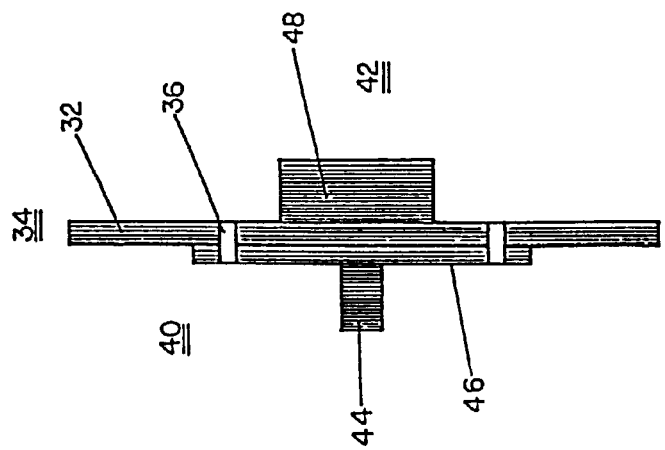
FIG. 2 is a side radial cross-sectional view of the solid radial disk of the present system.
Figure 4:
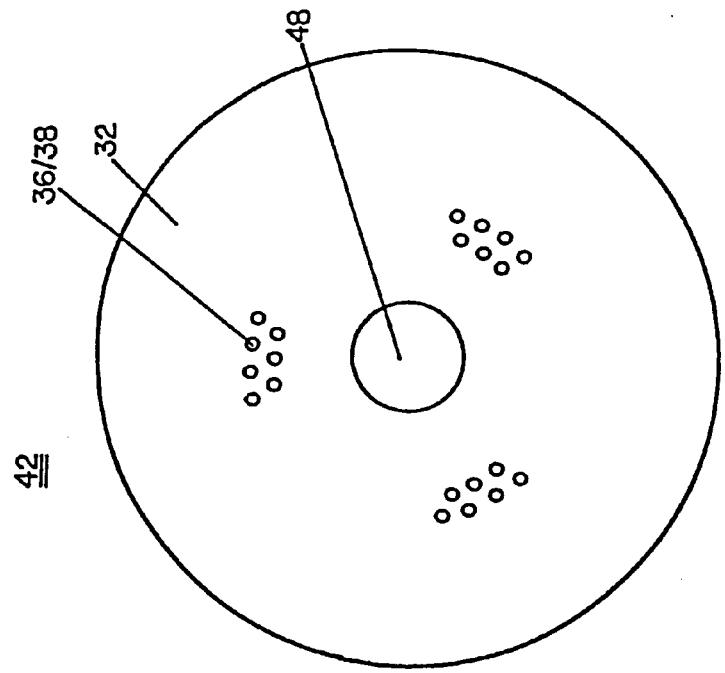
FIG. 4 is a right or downstream axial side plan view of the disk of FIG. 2.

Yet further shown in the axial cross-sectional view of FIG. 1 is a medially disposed rigid substantially solid disk 32 which is typically secured in the position shown in FIG. 1 by virtue of the packing of media 26 and 28 on either axial side thereof. In other words, substantially solid disk 32, unlike said porous disks 18, 20 and 22 may or may not be secured at the periphery thereof to the internal surface 16 of the pressure housing 10. In one embodiment, there is provided an annulus, that is, a concentric region 34 between the periphery of solid disk 32 and the inner surface 16 of the pressure housing 10. The structure of the solid disk 32 may be more fully appreciated with reference to the radial edge view of FIG. 2, the upstream side view of FIG. 3, and the downstream side view of FIG. 4. Therein, said solid disk 32 may be seen to include a plurality of apertures 36 arranged in discrete groups 38. Further, the structure of disk 32 is definable in terms of an upstream side 40 and a downstream side 42 thereof. More particularly, on the upstream side is provided an axial protrusion 44 which is dependent from a plate 46 secured to the disk proper 32. The exact geometry of protrusion 44 is considered noncritical to system performance.

On the downstream side 42 of disk 32 is provided an axial and radial region 48 of a radius greater than the radius of said axial protrusion 44 on the upstream side of the disk 32. Apart from this parameter, the geometry of region 48 is considered non-critical to system performance.

Figure 3:
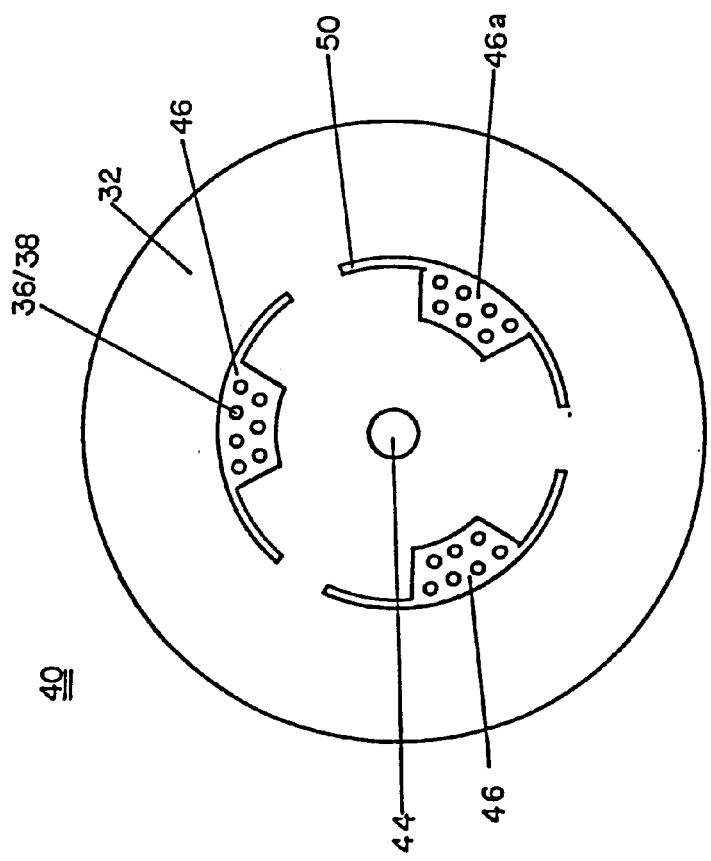
FIG. 3 is a left or upstream axial side plan view of the disk of FIG. 2.

With reference to FIG. 3, it may be seen that said plate 46 may take the form of a plurality of parts 46a, 46b and 46c in which each of said plates is provided with an axial projection 50 at a fixed radius from the longitudinal axis of the system.

It is believed that the combination of a narrower upstream member in the form of said axial protrusion 44 and a more massive downstream member in the form of region 48 contributes to desired characteristics of the instant system.

Accordingly, as may be noted with further reference to FIG. 1, a partial blockage of water flow, that occurs by virtue of the geometry of solid disk 32, operates upon the length of the path that the water must take through the showerhead filter, and it has been found to thereby increase of the velocity such water flow. A higher velocity of impact between the water and the various filtration media operates to improve the efficiency with which the media 26, 28 and 30 can remove contaminants and unwanted biologics therefrom. Further, the unique geometry of solid disk 34, and its particular placement within the pressure housing relative to the inside surface 16 thereof, contributes to the development of turbulence and radially random movement of water within and through the various filters and regions of the instant system, which contributes to efficiency of filtration.

It should be further appreciated that the small area, which apertures 36 (see FIG. 3) on disk 32 occupy, operates to decrease pressure on the upstream side 40 of disk 34 and therefore increase velocity of water exiting on the upstream side 40 (see FIG. 2) of disk 32. Said apertures have a diameter in a range of 1 to 8 millimeters, and are located at a radial distance, from the system axis, of 25 to 75 percent of the total interior radius of housing 10. Further, the apertures are arranged in groups (see FIGS. 3–4) of 5 to 120 apertures per group.

With further reference to FIG. 1, it is to be noted that inlet 12 flares into a conical region 50 before the unfiltered water reaches the first porous filter 18. Conversely, at the downstream side of the present system, water exits from porous filter 22 into a second conical region 52 and, therefrom, into the fluid outlet 14 of the system. The expansion of fluid flow from the inlet 12 into the first conical region 50 produces an effect which is a factor that operates to decrease velocity. Conversely, the reduction in area caused by the transition from second conical region 52 into outlet 14 operates to increase fluid pressure across the interface defined by third porous filter 22 thereby ensuring enhanced filtration of contaminants at the end of the filtration steps effected by the invention.

It has also been determined that the above-described structure of the present system addresses a difficulty in prior art showerhead filter systems known as channelling, that is, the creation of internal streams of water that operate to bypass large parts of the volume of filtration media 26, 28 and 30, thereby reducing the effectiveness of the entire system. Such channeling is, it is believed, prevented herein through increased randomness in the radial direction of the water which passes through the various filters and filtration media described above. As such, maximum use is made of the filtering and purification capacity of the elements of the system. Further, in one embodiment, the presence of annular region 34 operates to increase turbulence and therefore reduce possible dead spots in water flow.

As may be seen in media 26 and 28, water re-circulates many times therein before it finally proceeds through semi-porous filter 24, into activated carbon region 30, through third porous filter 22, and into the conical outlet region 42. Ideally, all filter elements throughout the body of the filter media bear an equal portion of the filtration burden. That is, any incoming particle of water has an equal chance of encountering any finite element of filter media. Further, during the time the filter is operating, all finite elements of filter media have the same probability distribution of encounters by water particles as any other finite element of filter media. This uniform probability distribution remains stable over the useful life of the filter.

Resultant of the above, there is provided a substantially uniform probability distribution that each particle of water will impact upon any given finite element of filtration media.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention what I claim as new, useful and non-obvious and, accordingly, secure by Letters Patent of the United States is:

1. A showerhead system including water purification means, comprising:
 (a) a fluid-tight pressure housing including fluid inlet and fluid outlet thereto, said outlet substantially co-axial with said inlet, said housing having an internal substantially cylindrical surface;
 (b) an axial distribution of a plurality of semi-porous radial filter disks disposed within said pressure housing, said semi-porous disks having circumferential edges thereof in integral communication with said internal surface of said pressure housing, in which said semi-porous disks each comprise particulate filters;
 (c) filtration media secured without regions defined between said semi-porous disks; and
 (d) at least one rigid radial disk disposed within said axial distribution of said semi-porous disks, said rigid disk having a plurality of apertures therein, said rigid disk having upstream and downstream surfaces thereof, in which said at least one rigid radial disk does not have an integral rigid securement to said internal cylindrical surface of said pressure housing, so that securement thereof is effected by packing of said filtration media thereagainst.

2. The system as recited in claim 1, in which said filtration media comprise:
 metallic media disposed at both said upstream and downstream sides of said rigid disk.

3. The system as recited in claim 2, said filtration media further comprises:
 activated carbon provided proximally to a downstream end of said pressure housing between successive semi-porous disks.

4. The system as recited in claim 1, in which said apertures of said rigid disk comprise:
 radially disposed groups of apertures.

5. The system as recited in claim 1, in which said rigid disk further comprises:
 an axial protrusion dependent from said upstream side thereof.

6. The system as recited in claim 5, in which said rigid disk further comprises:

an axial region of increased axial and radial thickness dependent from said downstream side thereof.

7. The system as recited in claim 4, in which said rigid disk further comprises:

an axial protrusion dependent from an upstream side of said rigid disk.

8. The system as recited in claim 7, in which said rigid disk further comprises:

an axial region of increased axial and radial thickness from a downstream side of said rigid disk.

9. The system as recited in claim 6 in which interior surfaces of said inlet and outlet of said housing are substantially conical.

10. The system as recited in claim 7, in which each of said groups of apertures situated, relative to a longitudinal axis of said pressure housing, at substantially like radial distances therefrom.

11. The system as recited in claim 7, in which each of said apertures each define a radial cross-section having a diameter in a range of 1 to 8 millimeters.

12. The system as recited in claim 11, in which the radius of said apertures from the axis of said housing is in the range of 25 to 75 percent of total radius.

13. The system as recited in claim 11, in which each of said groups of apertures define in the range of 5 to 120 apertures.

14. A showerhead system including water purification means, comprising:

(a) a fluid-tight pressure housing including fluid inlet and fluid outlet thereto, said outlet substantially co-axial with said inlet, said housing having an internal substantially cylindrical surface;

(b) an axial distribution of a plurality of semi-porous radial filter disks disposed within said pressure housing, said semi-porous disks having circumferential edges thereof in integral communication with said internal surface of said pressure housing, in which said semi-porous disks each comprise particulate filters;

(c) filtration media secured without regions defined between said semi-porous disks; and (d) at least one rigid radial disk disposed within said axial distribution of porous disks, said rigid disk having a plurality of apertures therein, said rigid disk having an upstream and a downstream surface thereof, said rigid disk further comprising an axial protrusion dependent from said upstream surface thereof.

15. The system as recited in claim 14 which said at least one rigid radial disk does not have integral rigid securement to said internal cylindrical surface of said pressure housing, so that the securement thereof is effected by packing of said filtration media thereagainst.

16. The system as recited in claim 14 in which said apertures of said rigid disk comprise:

radially disposed groups of apertures.

17. The system as recited in claim 14, in which said rigid disk further comprises:

an axial region of increased axial and radial thickness dependent from said downstream side thereof.

18. The system as recited in claim 14 in which said filtration media comprises:

metallic media disposed at both said upstream and downstream surfaces of said rigid disk.

19. The system as recited in claim 17 in which said filtration media further comprises:

activated carbon provided proximally to a downstream end of said pressure housing between successive semi-porous disks.

20. The system as recited in claim 14 in which each of said group of apertures, within said rigid disk, defines a location, relative to a longitudinal axis of said pressure housing, at substantially like radial distances therefrom.

21. The system as recited in claim 16 in which each of said apertures define a radial cross-section having a diameter in a range of one to eight millimeters.

22. The system as recited in claim 21 in which each of said groups of apertures defines a group in a range of 5 to 120 apertures.

23. The system as recited in claim 21 in which the radial distance of said apertures from the axis of said housing, defines a location in a range of about 25 to about 75 percent of a total interior radius of said housing.

24. The system as recited in claim 17 in which interior surfaces of said inlet and outlet of said housing are substantially conical.

* * * * *